US009483280B2

(12) United States Patent
Watanabe et al.

(10) Patent No.: US 9,483,280 B2
(45) Date of Patent: Nov. 1, 2016

(54) INFORMATION PROCESSING APPARATUS, PROGRAM, AND INFORMATION PROCESSING SYSTEM

(75) Inventors: Keitarou Watanabe, Tokyo (JP); Tomoharu Hikita, Tokyo (JP); Haruna Ochi, Kanagawa (JP); Itsuki Kamino, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 129 days.

(21) Appl. No.: 12/849,524

(22) Filed: Aug. 3, 2010

(65) Prior Publication Data

US 2011/0041064 A1    Feb. 17, 2011

(30) Foreign Application Priority Data

Aug. 11, 2009 (JP) .............................. P2009-186791

(51) Int. Cl.
| | | |
|---|---|---|
| G06F 3/0481 | (2013.01) | |
| G06F 3/0482 | (2013.01) | |
| G06F 3/0483 | (2013.01) | |
| H04L 29/06 | (2006.01) | |
| G06Q 10/10 | (2012.01) | |
| G06F 9/445 | (2006.01) | |

(52) U.S. Cl.
CPC .................................. G06F 9/44505 (2013.01)

(58) Field of Classification Search
CPC . H04L 29/06; H04L 29/08072; G06Q 10/10; G06F 3/0481; G06F 3/0482; G06F 3/0483
USPC ........................................ 715/810, 764, 733
See application file for complete search history.

(56) References Cited

U.S. PATENT DOCUMENTS

| | | | |
|---|---|---|---|
| 7,114,128 B2* | 9/2006 | Koppolu et al. ............... | 715/781 |
| 7,844,576 B2* | 11/2010 | Kruis et al. ................... | 707/621 |
| 8,533,199 B2* | 9/2013 | Malla ............................ | 707/741 |

(Continued)

FOREIGN PATENT DOCUMENTS

| | | |
|---|---|---|
| GB | 2421610 | 6/2006 |
| JP | 2006-099721 | 4/2006 |
| JP | 2008-282157 | 11/2008 |

OTHER PUBLICATIONS

European Patent Office, Extended European Search Report issued in connection with European Patent Application No. 10008103.3, dated Jul. 25, 2012. (4 pages).

(Continued)

*Primary Examiner* — Amy Ng
*Assistant Examiner* — Erik Stitt
(74) *Attorney, Agent, or Firm* — K&L Gates LLP

(57) ABSTRACT

An information processing apparatus includes a reading unit that reads, from a memory area of an IC chip, identification information of a service including at least any one of a wire communication service via an external wire communication or a wireless communication service via an external wireless communication, which use the memory area of the IC chip. The information processing apparatus also includes an acquisition unit that acquires service information to allow a user to use a service from an external server by transmitting the identification information of the service which the reading unit has read to the external server, and includes a display unit that displays to allow the user to use the service based on the service information which the acquisition unit has acquired.

17 Claims, 13 Drawing Sheets

(56) References Cited

U.S. PATENT DOCUMENTS

| | | | |
|---|---|---|---|
| 2002/0103824 A1* | 8/2002 | Koppolu et al. | 707/501.1 |
| 2003/0046290 A1* | 3/2003 | Yamada | 707/10 |
| 2003/0144984 A1* | 7/2003 | Dunbar | 707/1 |
| 2006/0206480 A1* | 9/2006 | Heidloff et al. | 707/6 |
| 2008/0177858 A1* | 7/2008 | Aarnio et al. | 709/217 |
| 2008/0283595 A1* | 11/2008 | Kimura et al. | 235/380 |
| 2010/0050067 A1* | 2/2010 | Curwen et al. | 715/206 |
| 2010/0082681 A1* | 4/2010 | Adimatyam et al. | 707/784 |
| 2010/0313170 A1* | 12/2010 | Ramos et al. | 715/838 |
| 2011/0078766 A1* | 3/2011 | Schachter | 726/3 |

OTHER PUBLICATIONS

Japanese Office Action issued Jan. 22, 2013 for corresponding Japanse Appln. No. 2006-099721.

\* cited by examiner

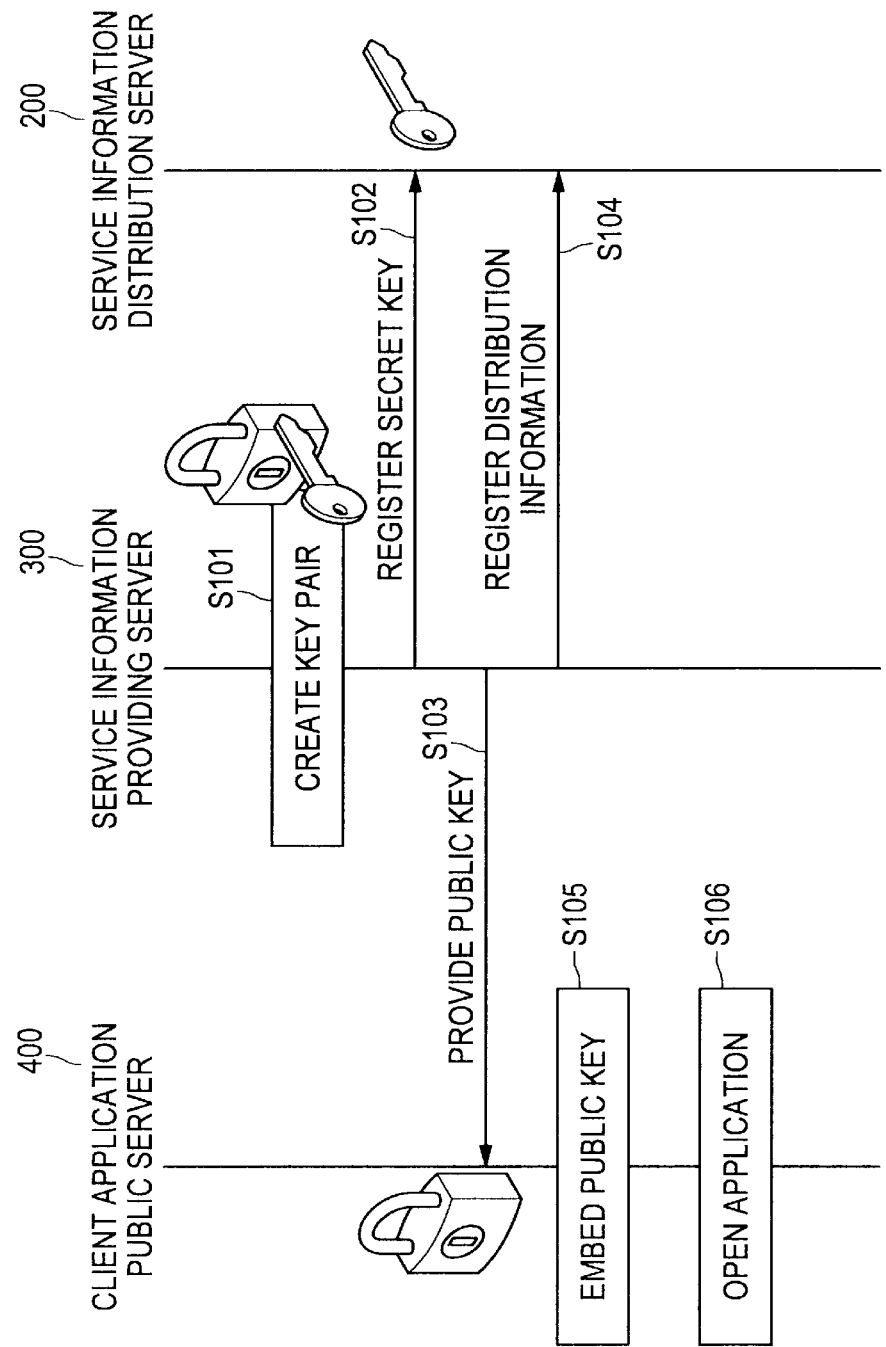

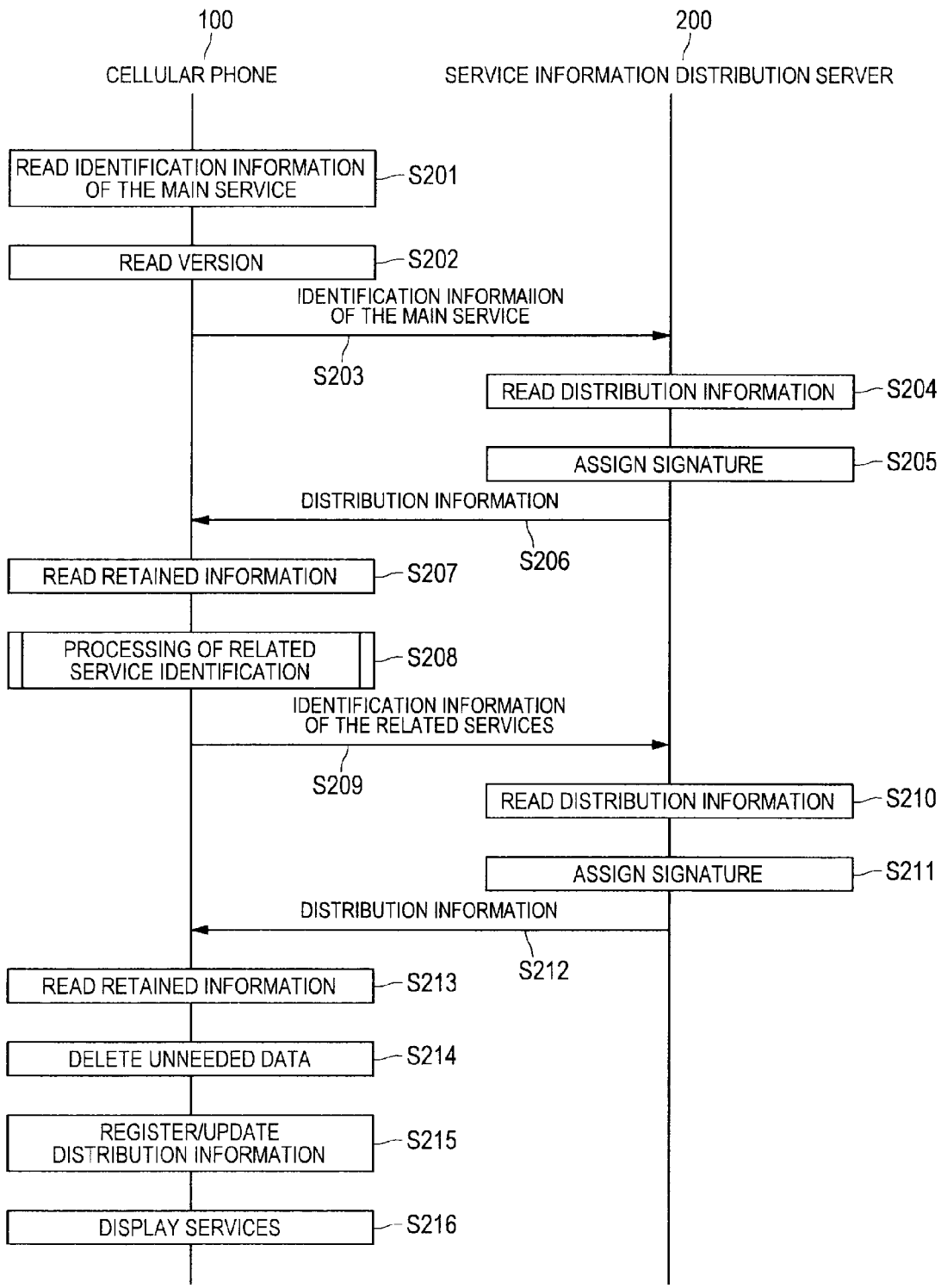

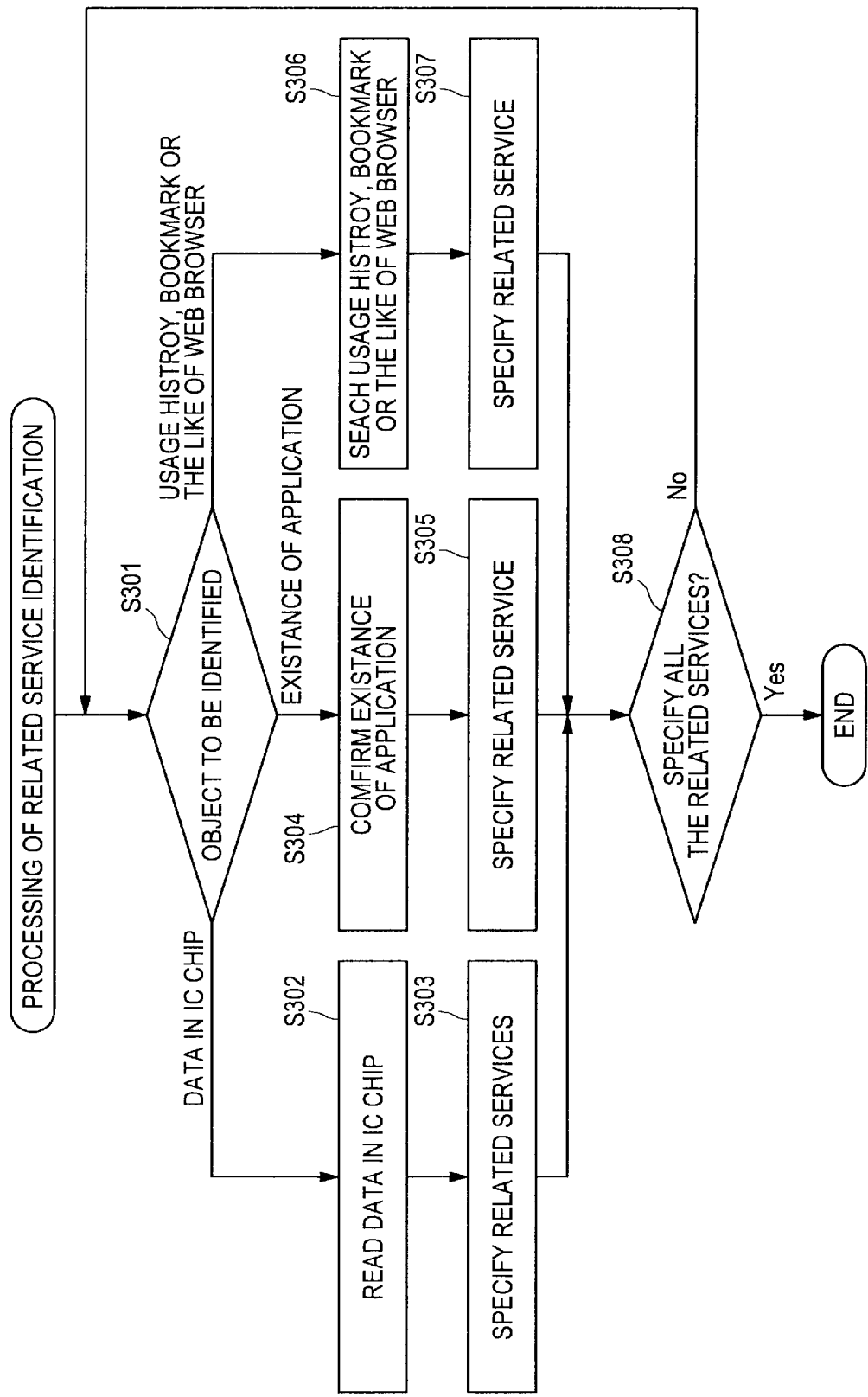

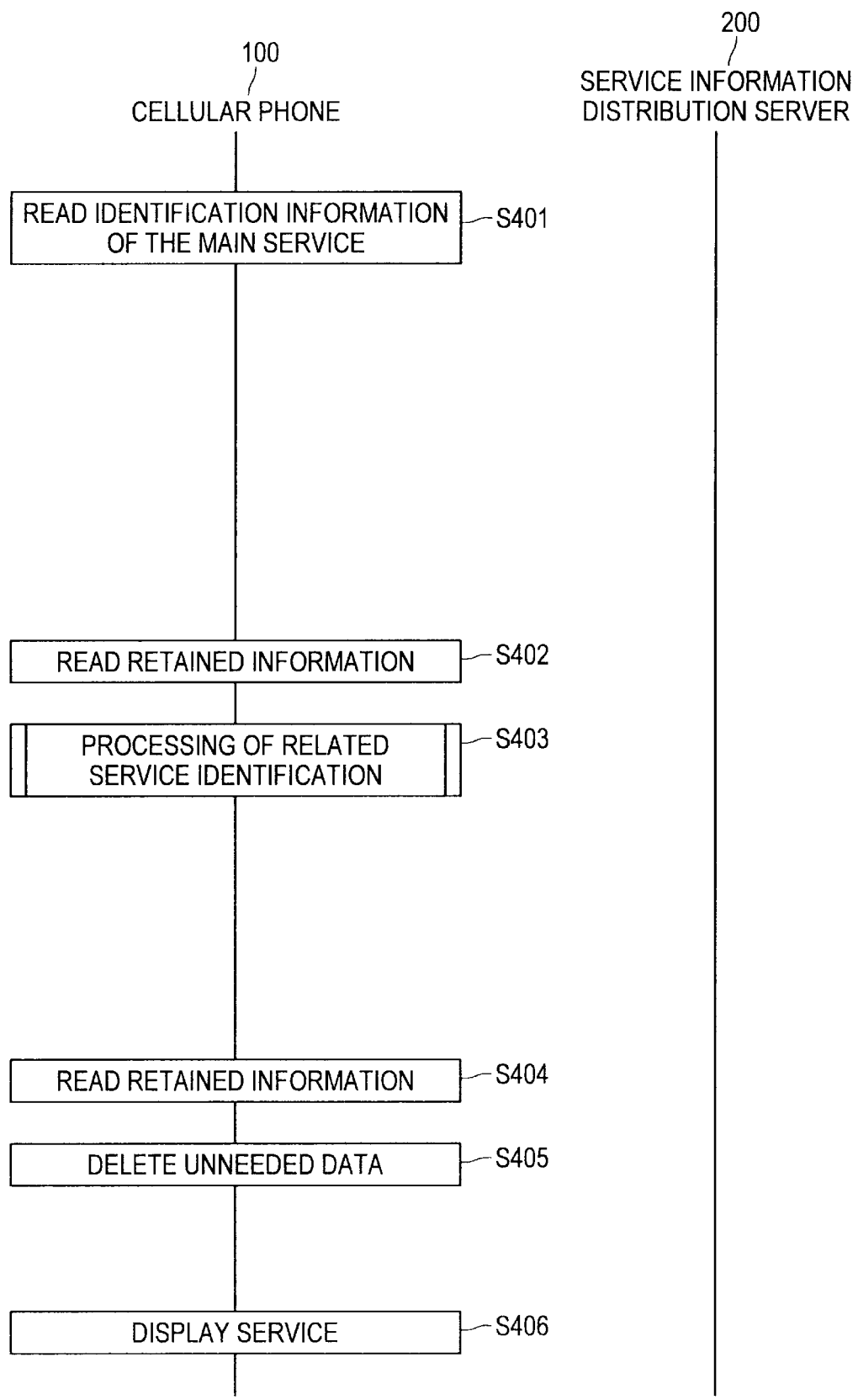

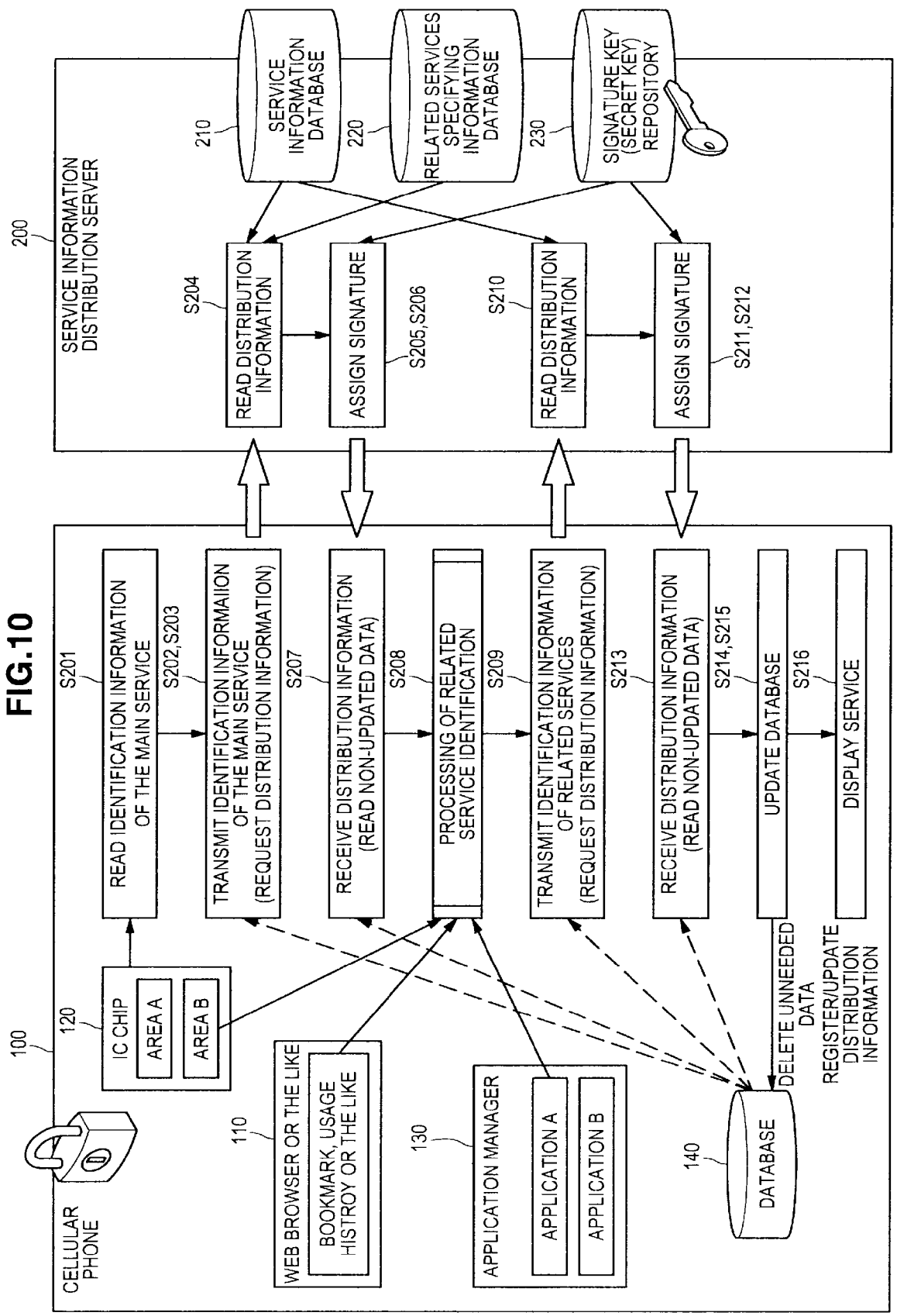

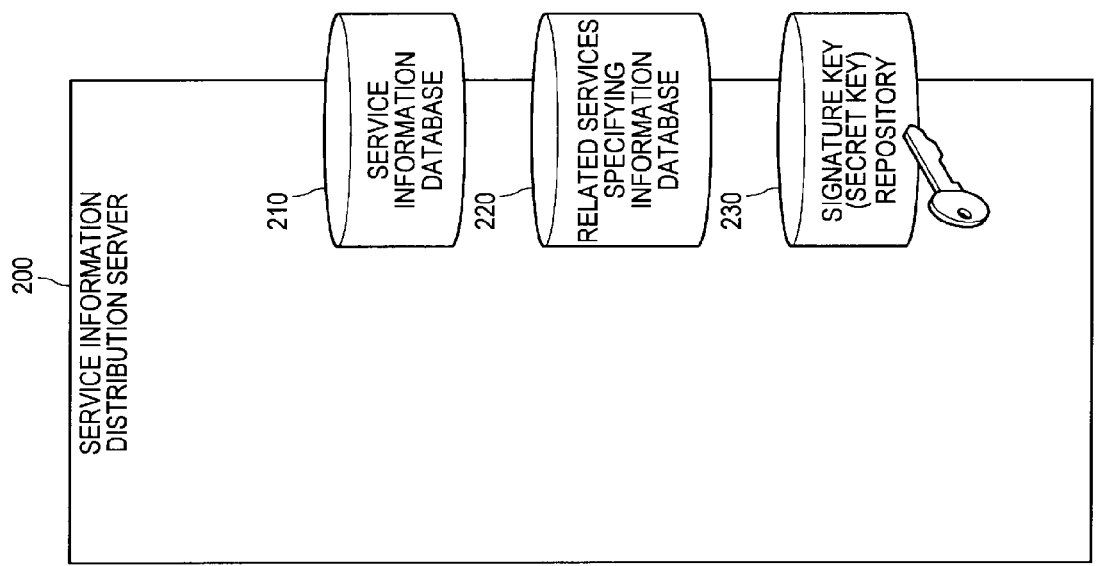
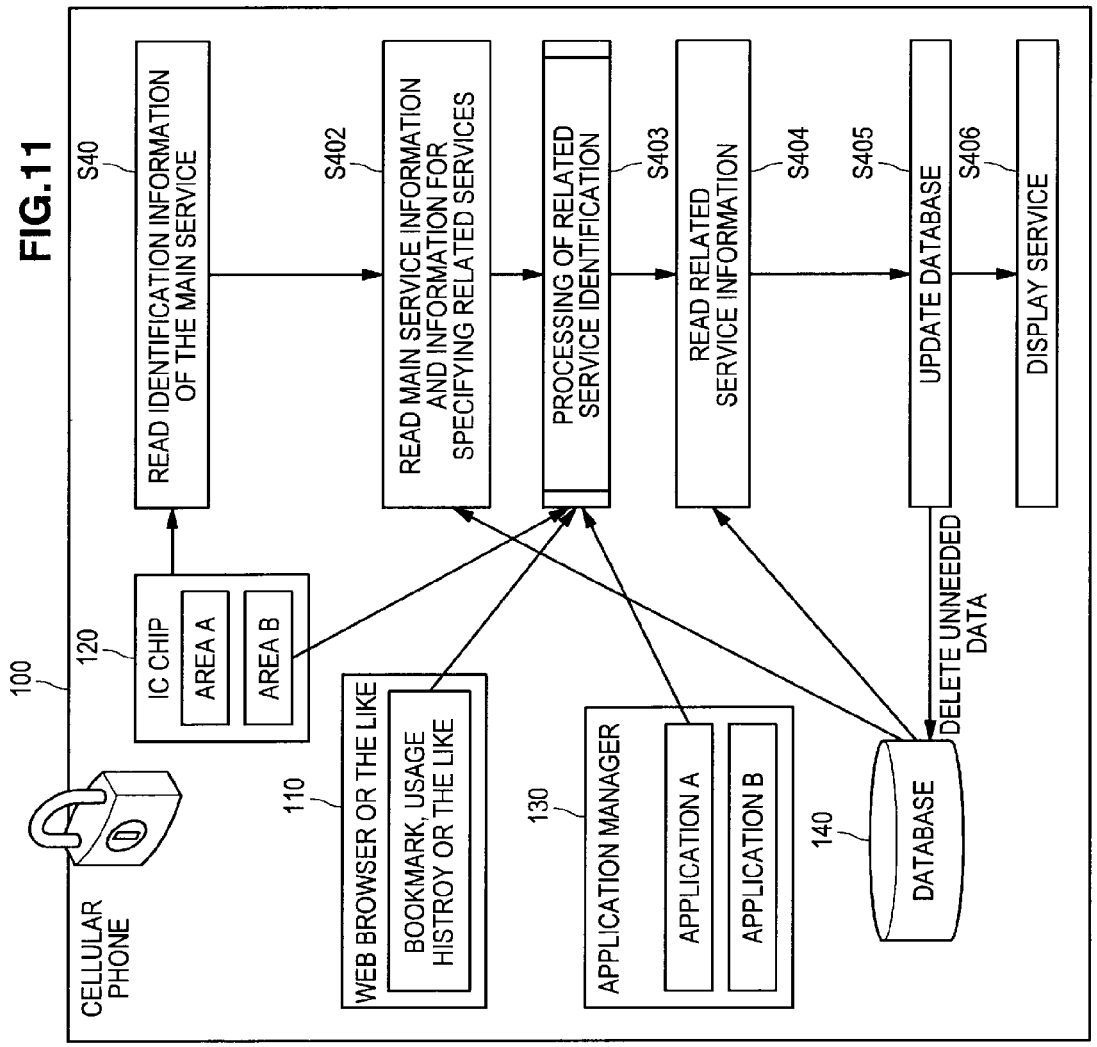

FIG.12

| ITEM | DESCRIPTION |
|---|---|
| ID INFORMATION | ID ASSIGNED FOR EACH SERVICE INFORMATION |
| VERSION INFORMATION | VERSION INFORMATION<br>* INFORMATION FOR DETERMININIG WHETHER TO NEED TO DISTRIBUTE ON REQUEST FROM CLIENT (CELLULER PHONE) |
| SERVICE NAME INFORMATION | SERVICE NAME TO BE PROVIDED |
| SERVICE ICON INFORMATION | IMAGE DATA TO BE DISPLAYED WHEN USER VEIWS |
| SERVICE COMPANY NAME INFORMATION | NAME OF THE COMPANY WHICH PROVIDES SERVICES |
| SERVICE COMPANY URL INFORMATION | URL INDICATING HOMEPAGE OF THE COMPANY WHICH PROVIDES THE SERVICES<br>* INFORMATION TO WHICH USER REFER VIA WEB BROWSER OR THE LIKE WHEN VIEWING |
| COOPERATIVE APPLICATION INFORMATION | INFORMATION FOR OBTAINING RELATED APPLICATIONS (SUCH AS URL FOR DOWNLOADING), AND INFORMATION FOR STARTING THE RELATED APPLICATIONS INSTALLED INTO THE SAME CELLULAR PHONE ARE RECORDED |
| SERVICE UNIQUE SCREEN INFORMATION | AREA WHICH DEFINES CONTENTS TO BE DISPLAYED UNIQUELY FOR EACH SERVICE COMPANY<br>EXAMPLES ARE AS FOLLOWS.<br>- DEFINE INFORMATION ON HTML/ECMAScript, ANALYZE AND DRAW THE INFORMATION ON CLIENT APPLICATION<br>- READ INFORMATION SUCH AS BALANCE, POINTS OR THE LIKE FROM IC CHIP, AND DRAW THEM. |

FIG.13

| ITEM | | DESCRIPTION |
|---|---|---|
| ID INFORMATION | | ID ASSIGNED FOR EACH INFORMATION FOR SPECIFYING RELATED SERVICES<br>→ONE IN EVERY MAIN SERVICE |
| VERSION INFORMATION | | VERSION FOR EACH OF ID ASSIGNED FOR EACH INFORMATION FOR SPECIFYING RELATED SERVICES<br>*INFORMATION FOR DETERMININING WHETHER TO NEED TO DISTRIBUTE ON REQUEST FROM CLIENT |
| IDENTIFICATION OBJECT/<br>IDENTIFICATION CONDITION INFORMATION | | A PLURALITY OF THE FOLLOWING CONTENTS ARE TO BE SET |
| | IDENTIFICATION OBJECT | DEFINE OBJECTS TO BE IDENTIFIED. EXAMPLES ARE AS FOLLOWS.<br>- DATA ON SPECIFIC PLACE OF IC CHIP<br>- SPECIFIC APPLICATION NAME<br>- BOOKMARK AND USAGE HISTORY OF WEB BROWSER |
| | IDENTIFICATION CONDITION | DEFINE CONDITION FOR SPECIFYING SERVICES IN ACCCORDANCE WITH THE STSTE OF THE OBJECT TO BE IDENTIFIED.<br>- IF DATA ON SPECIFIC PLACE OF IC CHIP IS<br>- X, DETERMINE THAT SERVICE A EXISTS<br>- SPECIFIC APPLICATION NAME<br>- DETERMINE THAT SERVICE A EXISTS IF THE APPLICATION EXISTS<br>- USAGE HISTORY OF WEB BROWSER<br>- DETERMINE THAT SERVICE A EXISTS IF THERE IS BOOK WITH BOOKMARK OF PAGE "a"<br>- DETERMINE THAT SERVICE A EXISTS IF THERE IS USAGE HISTORY WITHIN LAST SEVEN DAYS |

INFORMATION PROCESSING APPARATUS, PROGRAM, AND INFORMATION PROCESSING SYSTEM

CROSS REFERENCES TO RELATED APPLICATIONS

The present application claims priority to Japanese Patent Application JP 2009-186791 filed on Aug. 11, 2009, the entire contents of which is hereby incorporated by reference.

BACKGROUND

The present disclosure relates to an information processing apparatus, a program, and an information processing system.

In recent years, information processing apparatuses, such as cellular phones, etc., with tamper-resistant IC chips installed therein have become popular. It is very convenient that a user can perform data communication only by passing such the information processing apparatus over a reader/writer. By applying this information processing apparatus to electronic money systems, for example, the user can complete a payment immediately after just passing the information processing apparatus over the reader/writer at shops, etc.

Further, when using the above electronic money system, the user may start an application installed onto the information processing apparatus so as to confirm a usage history, a balance, etc., on a display screen. Thus, various applications can be installed onto the information processing apparatus.

Various technologies regarding the above-mentioned information processing apparatuses with IC chips have been developed. JP-A-2008-282157 discloses a technology which is capable of recovering consistency of areas of each of IC chips that have two areas relating mutually after moving data between the IC chips.

SUMMARY

An information processing apparatus such as a cellular phone with an IC chip needs to enable a user to view services registered in the information processing apparatus by displaying services that uses a memory area of the IC chip.

An information processing apparatus such as a cellular phone with a conventional IC chip has been displaying services based on information of applications that use a memory area of an IC chip.

However, forms of services registered in an information processing apparatus is being diversified, for example, a service that uses a memory area of an IC chip accessed via an external wire communication, such as communication via Web browser, a service that uses the memory area of the IC chip accessed by an external wireless communication, such as non-contact communication from a reader/writer, or the like. Such services do not use applications. Therefore, there has been a problem in a conventional way of displaying services in which among services using the memory area of the IC chip, services not using applications cannot be displayed.

In light of the foregoing, it is desirable to provide an information processing apparatus, a program, and an information processing system, which are capable of enabling a user to view all services including services that use a memory area of an IC chip but do not use an application.

According to an embodiment, there is provided an information processing apparatus including a reading unit that reads, from a memory area of an IC chip, identification information of a service including at least any one of a wire communication service via an external wire communication or a wireless communication service via an external wireless communication, which use the memory area of the IC chip, an acquisition unit that acquires service information to enable a user to use a service from an external server by transmitting the identification information of the service which the reading unit has read to the external server, and a display unit that displays to enable the user to use the service based on the service information which the acquisition unit has acquired.

According to such a configuration, the user can view a display of all the services that use the memory area of the IC chip, but not use an application.

The service may include services that use applications internally installed.

The information processing apparatus may further include a storage unit that stores the service information which the acquisition unit has acquired. The acquisition unit may acquire service information of a new version by transmitting version information included in the service information as well as the identification information of the service which the reading unit has read, to the external server, if the service information is stored in the storage unit. The display unit may display to enable the user to use the service based on the service information of the new version if the acquisition unit acquires the service information of the new version, and may display to enable the user to use the service based on the service information stored in the storage unit if the acquisition unit does not acquire the service information of the new version.

The service may include a main service which owns the memory area of the IC chip, and a related service that uses the memory area owned by the main service. The reading unit may specify the related service that relates to the main service, based on information for specifying the related service which the acquisition unit has acquired or which the reading unit has acquired from the storage unit.

The storage unit may store the service information of the new version in place of the service information of an old version when the acquisition unit acquires the service information of the new version.

The display unit may display to enable the user to use the service based on the service information stored in the storage unit if the acquisition unit cannot acquire the service information from the external server when the service information is stored in the storage unit.

In an embodiment, the service may include the main service which owns the memory area of the IC chip, and the related service that uses the memory area owned by the main service. The reading unit may read identification information of the main service that uses the memory area of the IC chip. The acquisition unit may acquire main service information for enabling the user to use the main service and the information for specifying the related service from the external server by transmitting the identification information of the main service which the reading unit has read to the external server. The reading unit may read the identification information of the related service based on the information for specifying the related service. The acquisition unit may acquire related service information for enabling the user to use the related service from the external server by transmitting the identification information of the related service which the reading unit has read to the external server. The display unit may display to enable the user to use the main service and the related service based on the main service information and the related service information which the acquisition unit has acquired.

In an embodiment, the information processing apparatus may further include a storage unit which stores the main service information that the acquisition unit has acquired, and the related service information, and the information for specifying the related service. The reading unit may read the identification information of the related service based on the information for specifying the related service stored in the storage unit, if the acquisition unit cannot acquire the information for specifying the related service from the external server when the information for specifying the related service is stored in the storage unit. The display unit may display to enable the user to use the main service and the related service based on the main service information and the related service information which are stored in the storage unit, if the acquisition unit cannot acquire neither the main service information nor the related service information from the external server when the main service information and the related service information are stored in the storage unit.

The information for specifying the related service may include information for specifying the service based on data in the memory area of the IC chip, information for specifying the service based on the applications installed in the information processing apparatus, or information for specifying the service based on an usage history or a bookmark of a web browser.

According to another embodiment, there is provided a program that causes a computer to function as a reading unit that reads, from a memory area of an IC chip, identification information of a service including at least any one of a wire communication service via an external wire communication or a wireless communication service via an external wireless communication, which use the memory area of the IC chip, an acquisition unit that acquires service information to enable a user to use a service from an external server by transmitting the identification information of the service which the reading unit has read to the external server, and a display unit that displays to enable the user to use the service based on the service information which the acquisition unit has acquired.

Using such a program, the user can view the display of all the services that use the memory area of the IC chip but do not use an application.

According to another embodiment, there is provided an information processing apparatus including an information processing apparatus, and an external server that is capable of communicating with the information processing apparatus. The information processing apparatus include a reading unit that reads, from a memory area of an IC chip, identification information of a service including at least any one of a wire communication service via an external wire communication or a wireless communication service via an external wireless communication, which use the memory area of the IC chip, an acquisition unit that acquires service information to enable a user to use a service from an external server by transmitting the identification information of the service which the reading unit has read to the external server, and a display unit that displays to enable the user to use the service based on the service information which the acquisition unit has acquired.

Using such a system, the user can view the display of all the services that use the memory area of the IC chip but do not use an application.

According to the embodiments described above, a user can view a display of all services including a service that use a memory area of an IC chip but does not use an application.

Additional features and advantages are described herein, and will be apparent from the following Detailed Description and the figures.

BRIEF DESCRIPTION OF THE FIGURES

FIG. 6 is a sequence diagram showing a preliminary processing of displaying services, executed by the information processing apparatus according to the embodiment;

FIG. 7 is a sequence diagram showing a processing of displaying services according to the embodiment;

FIG. 8 is a flow chart showing a processing of related service identification executed in step S208 in FIG. 7.

FIG. 9 is a sequence diagram showing a processing of displaying other services according to the embodiment;

FIG. 10 is an illustration for illustrating a detail on the processing of displaying services in FIG. 7;

FIG. 11 is an illustration for illustrating a detail on the processing of displaying the other services in FIG. 9;

FIG. 12 is an illustration for illustrating a configuration of the service information;

FIG. 13 is an illustration for illustrating a configuration of information for specifying the related services.

DETAILED DESCRIPTION

Figure 1:
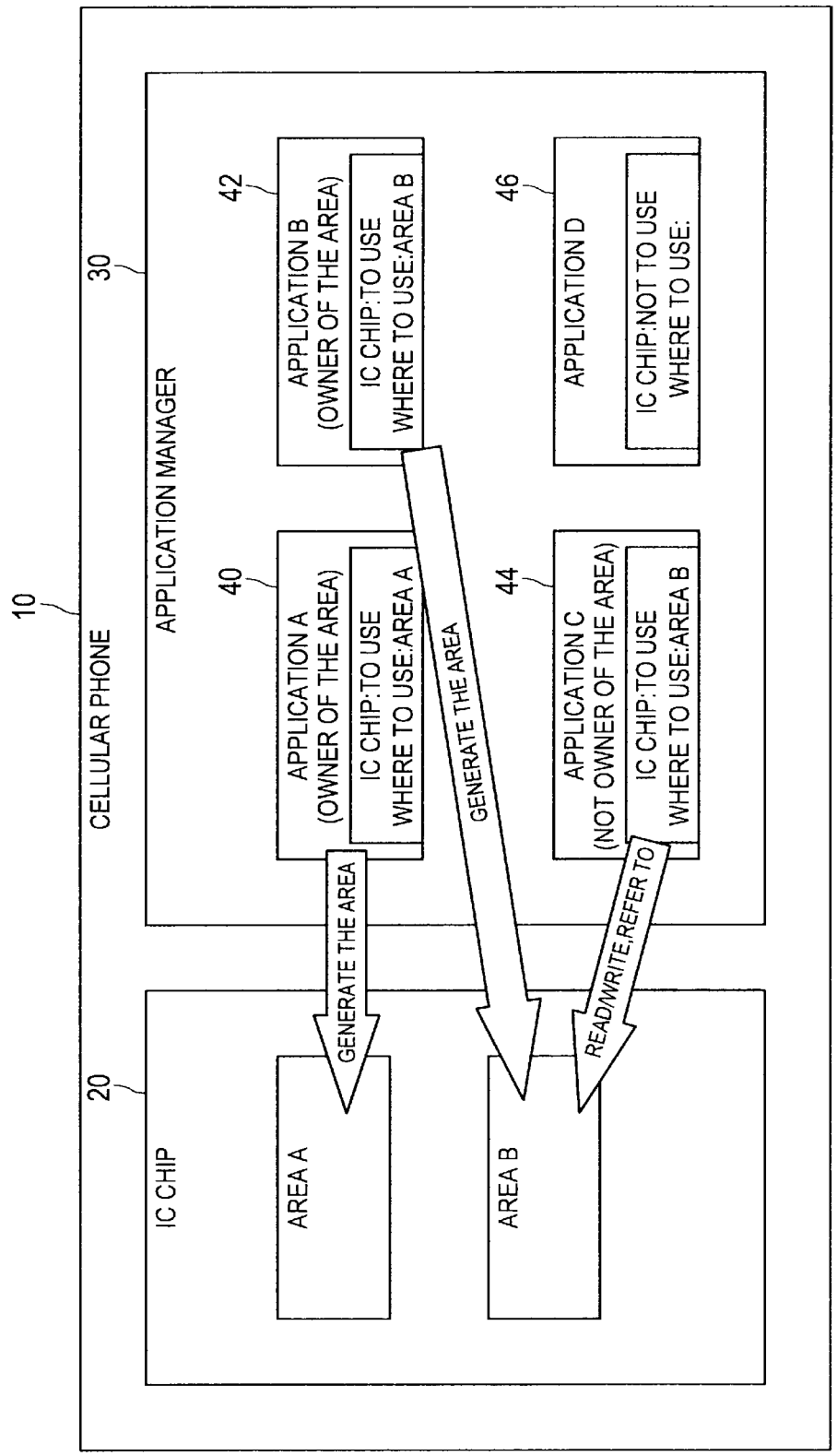
FIG. 1 is an illustration for illustrating a method of displaying services registered in a conventional information processing apparatus.

Hereinafter, embodiments will be described in detail with reference to the appended drawings. Note that, in this specification and the appended drawings, structural elements that have substantially the same function and structure are denoted with the same reference numerals, and repeated explanation of these structural elements is omitted.

The explanation is given in the following order:
1. A conventional method of displaying services
2. A configuration of an information processing system
3. A hardware configuration of a cellular phone
4. A functional configuration of the cellular phone
5. A preliminary processing of displaying services
6. A processing of displaying services
7. A processing of displaying other services

[A Conventional Method of Displaying Services]

Before explaining an information processing system according to embodiments, first, an explanation will be given on a method of displaying registered services in a conventional information processing apparatus. FIG. 1 is an illustration for illustrating the method of displaying registered services in a conventional information processing apparatus.

In FIG. 1, a cellular phone 10 as an example of the conventional information processing apparatus includes an IC chip 20 and an application manager 30. The IC chip 20 includes a storage device (not shown), and a service registered in the cellular phone 10, such as an electronic money service, for example, uses an area A or an area B as a memory area of the storage device. Further, the IC chip 20 is an IC chip compatible to a plurality of applications.

The application manager 30 performs a management or the like of an application A40, an application B42, an application C44 and an application D46, which are installed on the cellular phone 10. In the application A40, the application B42, the application C44 and the application D46 there is described information on whether to use a memory area of the IC chip 20 and information on an address of the memory area to be used.

The application A40 is an application used by an electronic money service, for example, and owns the area A of the IC chip 20. The application B42 is an application used by other services, and owns the area B of the IC chip 20. The application C44 is an application used by the other services, and is an application which does not own the memory area of the IC chip 20 but uses the area B of the IC chip 20. The application D46 is an application used by services which do not use the memory area of the IC chip 20.

Since the application A40 and the application B42 owns the memory area of the IC chip 20, they can generate and delete the memory area, and read/write and refer to data or the like in the memory area. Since the application C44 does not own the memory area of the IC chip 20, they cannot generate or delete the memory areas, but can read/write and refer to data or the like in the memory area.

In the cellular phone 10 as the conventional information processing apparatus, by passing an application information describing that the application manager 30 uses the memory area of the IC chip 20, to an application (not shown) for displaying services, the application for displaying services displays services registered in the cellular phone 10 based on the passed information on the application. The application manager 30 has a function to restrict deletion of the application A40 that owns the area A, when the area A exists in the IC chip 20.

Figure 2:
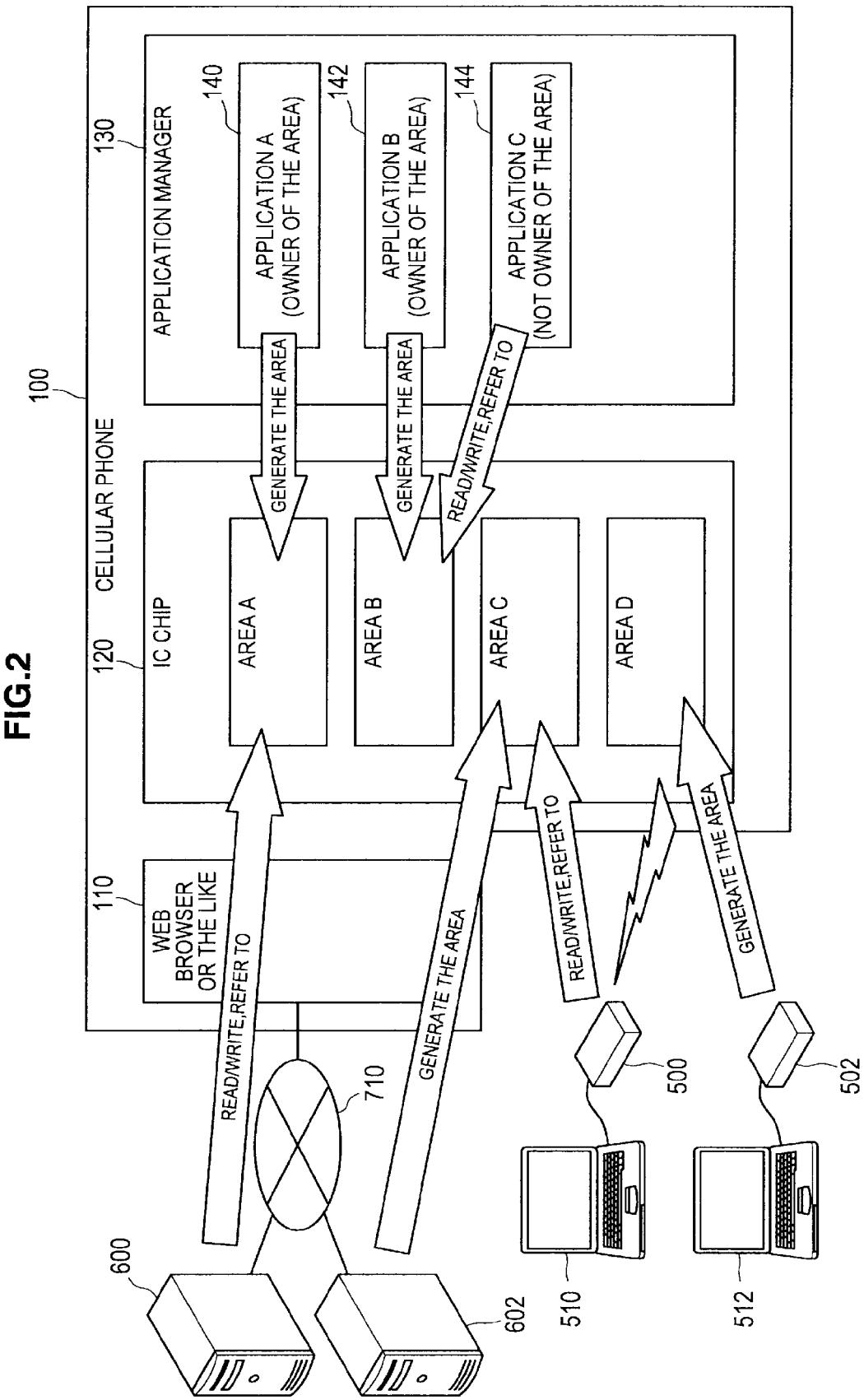
FIG. 2 is an illustration for illustrating a form of services registered in a cellular phone that is an example of an information processing system.

A form of services registered in a cellular phone as an information processing apparatus are becoming more diversified. FIG. 2 is an illustration for illustrating the form of services registered in the cellular phone as the information processing apparatus.

In FIG. 2, a cellular phone 100 as the information processing apparatus includes a Web browser or the like 110, an IC chip 120 and an application manager 130. The application manager 130 performs a manager or the like of an application A140, an application B142 and an application C144 which are installed on the cellular phone 100. The application A140 is an application used by the electronic money service, for example, and owns the area A of the IC chip 120. The application B142 is an application used by other services, and owns the area B of the IC chip 120. The application C144 is an application used by the other services, and is an application which does not own the memory area of the IC chip 120 but uses the area B of the IC chip 120.

In the cellular phone 100, there are registered services that use the memory area of the IC chip 120 which is used through the Web browser or the like 110 that accesses a service providing servers 600 and 602 capable of communicating with the cellular phone 100 via a communication network 710. This service is an example of a wire communication service of the present embodiment. The service providing server 600 is a service providing server that does not own the memory area of the IC chip 120 and that uses the area A of the IC chip 120. The service providing server 602 is a service providing server that owns an area C of an IC chip 120.

In the cellular phone 100, there are registered services which use the memory area of the IC chip 120, and which are available via non-contact communication with an information processing apparatus 510 having a reader/writer 500 capable of communicating in a non-contact manner with the cellular phone 100. Further, in the cellular phone 100, there are registered services which use the memory area of the IC chip 120, and which are available via non-contact communication with an information processing apparatus 512 having a reader/writer 502 capable of communicating in a non-contact manner with the cellular phone 100. In the present embodiment, the information processing apparatuses 510 and 512 are, for example, a PC (Personal Computer), a POS (Point of sale) terminal, an automatic payment machine or an automatic vending machine. This service is an example of a wireless communication service of the present invention. The information processing apparatus 510 is an information processing apparatus which does not own the memory area of the IC chip 120, but uses the area C of the IC chip 120. The information processing apparatus 512 is an information processing apparatus that owns an area D of the IC chip 120.

As described above, in the cellular phone 10 as the conventional information processing apparatus, an application (not shown) for displaying services displayed services registered in the cellular phone 10. Specifically, services registered in the cellular phone 10 were displayed based on the information passed from the application manager 30, the information which describes the memory area of the IC chip 20 will be used. However, services through the web browser or the like 110 accessed from the service providing servers 600 and 602, and services by a non-contact communication from the information processing apparatuses 510 and 512, shown in FIG. 2, do not use applications. Because of this, there has been a problem that services that do not use applications cannot be displayed in the conventional method of displaying services.

Then a later-described information processing system 1000 according to the present embodiment performs a later-described preliminary processing for displaying services and a processing of displaying services. This enables displaying all services including those which use the memory area of the IC chip 120 and do not use applications. Hereinafter, a main service means a service that uses an application which owns the memory area of the IC chip 120, or a service provided by a service providing server or an information processing apparatus, which own the memory area of the IC chip 120. Further, a related service means a service which does not own the memory area of the IC chip 120 and uses the application that uses the memory area of the IC chip 120, or services which are provided by the service providing server or an information processing apparatus which does not own the memory of the IC chip but uses the memory area of the IC chip 120.

[A Configuration of an Information Processing System]

Figure 3:
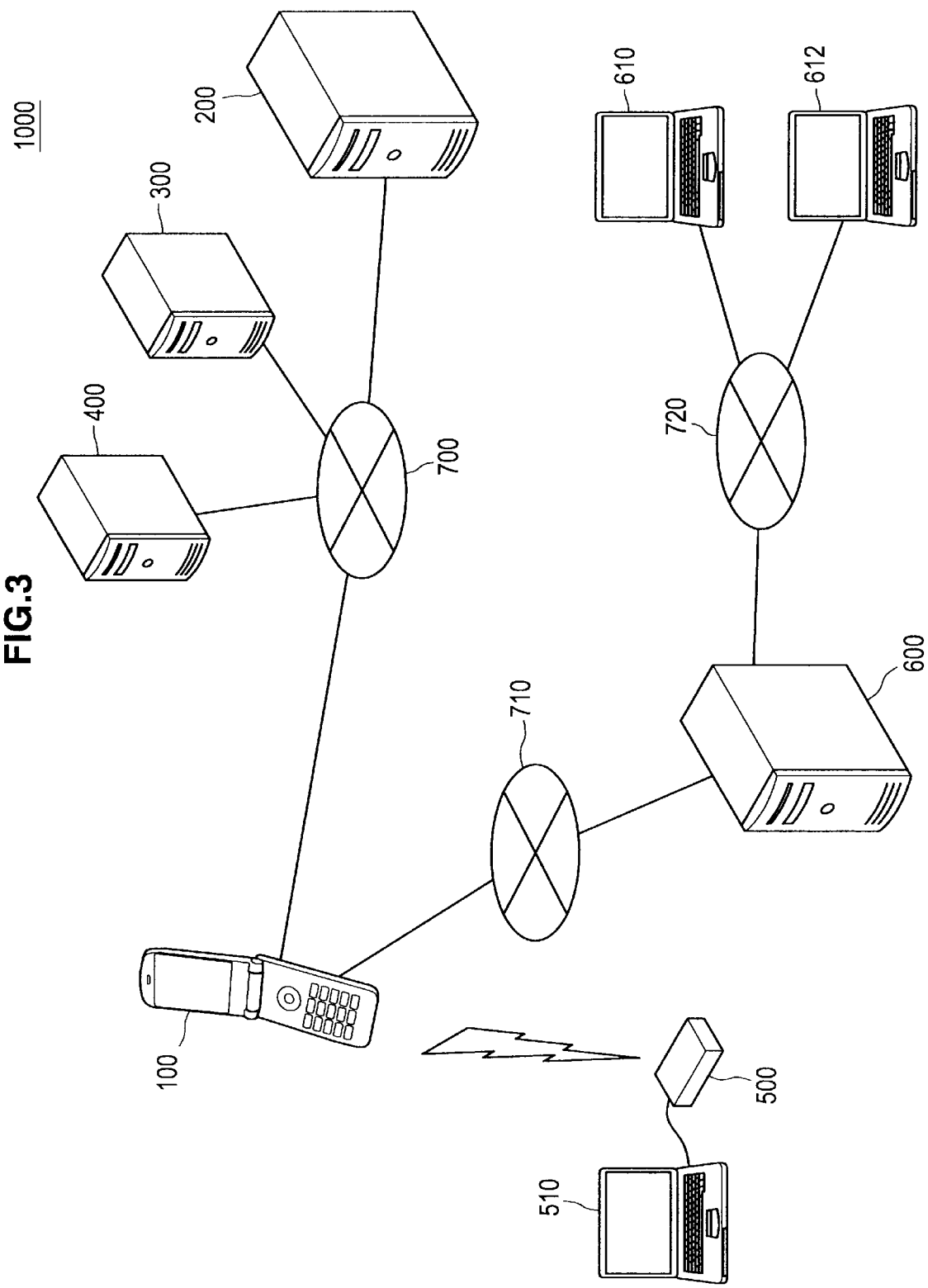
FIG. 3 is an illustration for illustrating a schematic configuration of an information processing system according to an embodiment.

Next, an explanation will be given on the information processing system according to the present embodiment. FIG. 3 is an illustration for illustrating a schematic configuration of the information processing system according to the present embodiment.

In FIG. 3, the information processing system 1000 is mainly configured from the cellular phone 100 and a service information distribution server 200. The information processing system 1000 is an example of an information processing system. The cellular phone 100 is an information processing apparatus. The service information distribution server 200 is an example of an external server. The cellular phone 100 and the service information distribution server 200 are configured to be capable of communicating with each other via a communication network 700.

The cellular phone 100 includes the IC chip 120 described later. The IC chip 120 includes a later-described storage device 184. A service registered in the cellular phone 100, such as an electronic money service, for example, uses a memory area of the storage device 184. In the service information distribution server 200, service information shown in FIG. 12 as later-described distribution information and information for specifying related services shown in FIG. 13 are registered in the preliminary processing for displaying services shown in FIG. 6 described later. The cellular phone 100 and the service information distribution server 200 perform a later-described processing of displaying services in FIG. 7.

The information processing system 1000 includes a service information providing server 300, and a client application public server 400. The cellular phone 100, the service information distribution server 200, the service information providing server 300, and the client application public server 400 are configured to be capable of communicating via the communication network 700. The service information distribution server 200, the service information providing server 300, and the client application public server 400 perform a later-described preliminary processing for displaying services shown in FIG. 6.

The information processing system 1000 includes the information processing apparatus 510 having the reader/writer 500, a service providing server 600, and information processing apparatuses 610 and 612. In the present embodiment, the information processing apparatuses 610 and 612 are, for example, personal computers. The cellular phone 100 and the reader/writer 500 can communicate each other in non-contact manner. The cellular phone 100 and the service providing server 600 are configured to be able to communicate via a communication network 710. The service providing server 600, and the information processing apparatuses 610 and 612 are configured to be able to communicate via a communication network 720. The information processing apparatus 510 is an information processing apparatus for providing services that use the memory area of the IC chip 120, and that are available via non-contact communication. The service providing server 600 is a service providing server for providing services that use the memory area of the IC chip 120, and that are available via the communication network 710. The information processing apparatus 610 and 612 are information processing apparatuses which own the service providing server 600.

[A Hardware Configuration of a Cellular Phone]

Figure 4:
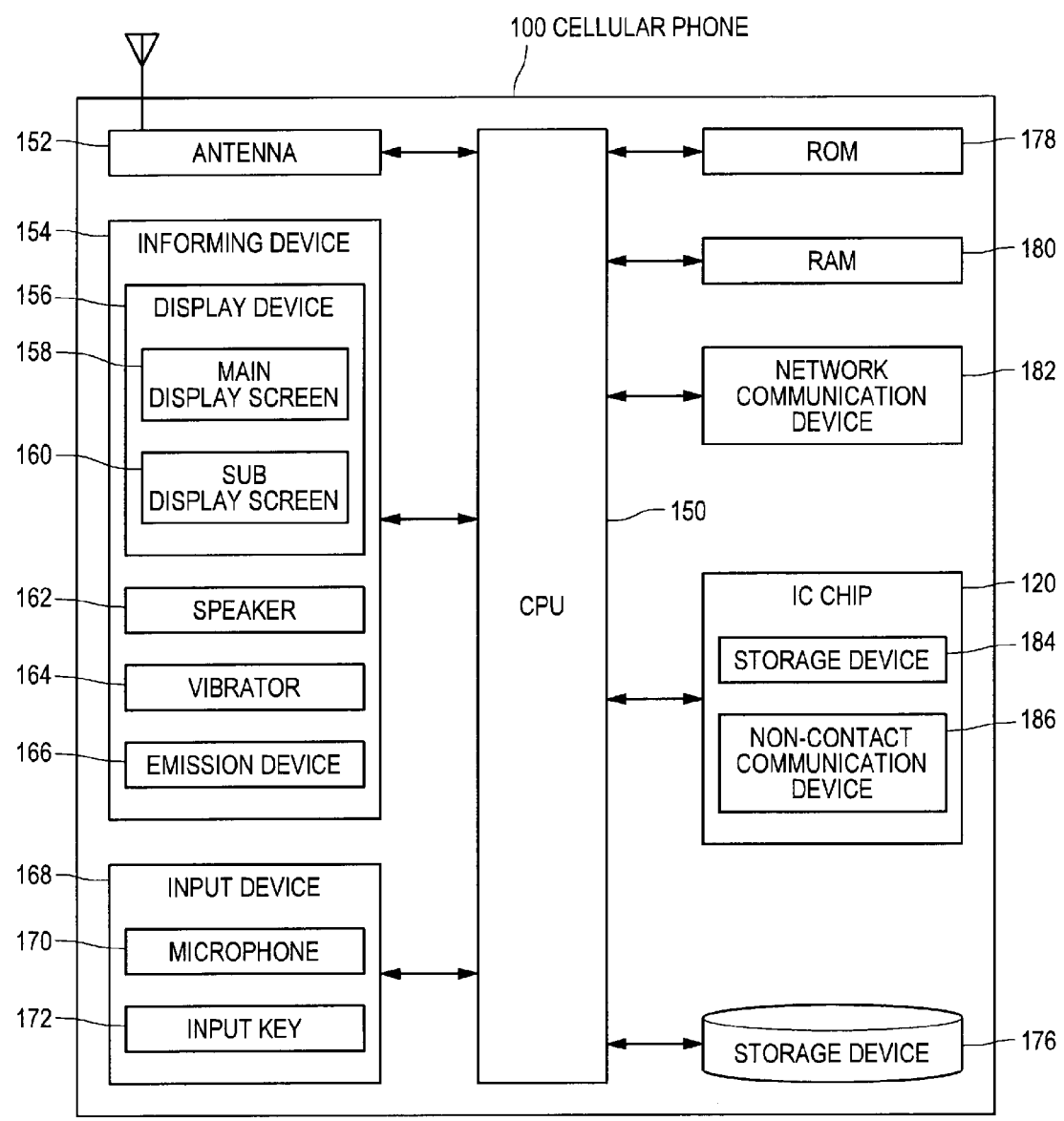
FIG. 4 is a block diagram for illustrating a hardware configuration of a cellular phone according to the embodiment.

Next, a hardware configuration of the cellular phone 100 according to the present embodiment will be explained. FIG. 4 is a block diagram for illustrating a hardware configuration of the cellular phone 100 according to the present embodiment.

In FIG. 4, the cellular phone 100 includes a CPU (Central Processing Unit) 150, an antenna 152, an informing device 154, an input device 168, a storage device 176, a ROM 178, a RAM 180, a network communication device 182, and the IC chip 120. The cellular phone 100 further includes, other than shown in FIG. 4, a bus, a bridge, an interface, or the like.

The CPU 150 functions as an arithmetic processing unit or a control unit, for example, and controls an entire or a part of the operation of each component based on each of programs recorded on the storage device 176, the ROM 178, the RAM 180, or a removal recording medium (not shown).

The ROM 178 stores, for example, a program to be loaded on the CPU 150 or data or the like used in an arithmetic operation. The RAM 180 temporarily or perpetually stores, for example, a program to be loaded on the CPU 150 or various parameters or the like arbitrarily changed in execution of the program.

The storage device 176 is a device to store various data. The storage device 176 is configured from, for example, a magnetic storage device such as a hard disk drive (HDD; Hard Disk Drive), a semiconductor storage device, an optical storage device, or a magneto-optical storage device. In the present embodiment, the storage device 176 has a later-described database 140.

The antenna 152 is configured to be able to be both expanded and contracted, for example, so that it is housed in a part of housing of the cellular phone 100 and is pulled out from the part of housing. The antenna 152 transmits/receives radio waves by wireless, for example, for functions such as phone calls and e-mails.

The informing device 154 is mainly configured from a display device 156, a speaker 162, a vibrator 164, and an emission device 166. The display device 156 is configured, for example, from a main display screen 158 and a sub display screen 160. The main display screen 158 and the sub display screen 160 are display devices, for example, such as a LCD (Liquid Crystal Display), an ELD (Electro-Luminescence Display), or the like. The main display 158 displays for notifying incoming emails or incoming calls, for example. Note that the main display screen 158 displays services registered in the cellular phone 100 as described later. The sub display screen 160 displays for notifying incoming emails or incoming calls, for example, when the cellular phone 100, in a flip style that is openable and closable, is closed.

The speaker 162 outputs an audio signal received by the antenna 152. The speaker 162 also outputs an audio signal for notifying incoming emails or incoming calls, for example. The vibrator 164 notifies the incoming emails or incoming calls by vibrating the cellular phone 100. The emission device 166 notifies the incoming emails or incoming calls by lighting up a lamp or the like.

The input device 168 is configured from mainly a microphone 170 and an input key 172. The microphone 170 is mainly a device for inputting an audio signal. The microphone 170 is used, for example, for calling. The input key 172 is a numerical keypad, a power key, a call key, or the like. The input key 172 is used, for example, for inputting a telephone number of the other party and creating emails. The input device 168 may be a remote control means, which is a remote control, which is capable of transmitting a control signal using infrared rays or other radio waves. The input device 168 is configured from an input control circuit or the like, which is for transmitting information input using the above operational means to the CPU 150 as an input signal.

The network communication device 182 is a communication device for connecting to the network, for example, such as a communication card for a wired or wireless local area network (LAN) or wireless USB (WUSB). The network communication device 182 is a modem or the like for various communications. Further, a communication network connected to the network communication device 182 is configured mainly by a network which is connected wirelessly. For example, the communication network may be the Internet, infrared communication, visible light communication, broadcasting or the like.

The IC chip 120 is mainly configured from a CPU (not shown), a ROM (not shown), a RAM (not shown), the storage device 184 and a non-contact communication device 186. The CPU (not shown) functions as an arithmetic processing unit or a control unit, for example based on each of programs recorded on the ROM (not shown), the RAM (not shown), or the storage device 184. In the present embodiment, the cellular phone 100 is a cellular phone which is capable of non-contact communication, and the CPU (not shown) mainly controls an entire or a part of the operation of the non-contact communication device 186. The ROM (not shown) stores, for example, a program to be loaded on the CUP (not shown) or data or the like used in an arithmetic operation. The RAM (not shown) temporarily or perpetually stores, for example, a program to be loaded on the CPU (not shown) or various parameters or the like arbitrarily changed in execution of the program.

[A Functional Configuration of the Cellular Phone]

Figure 5:
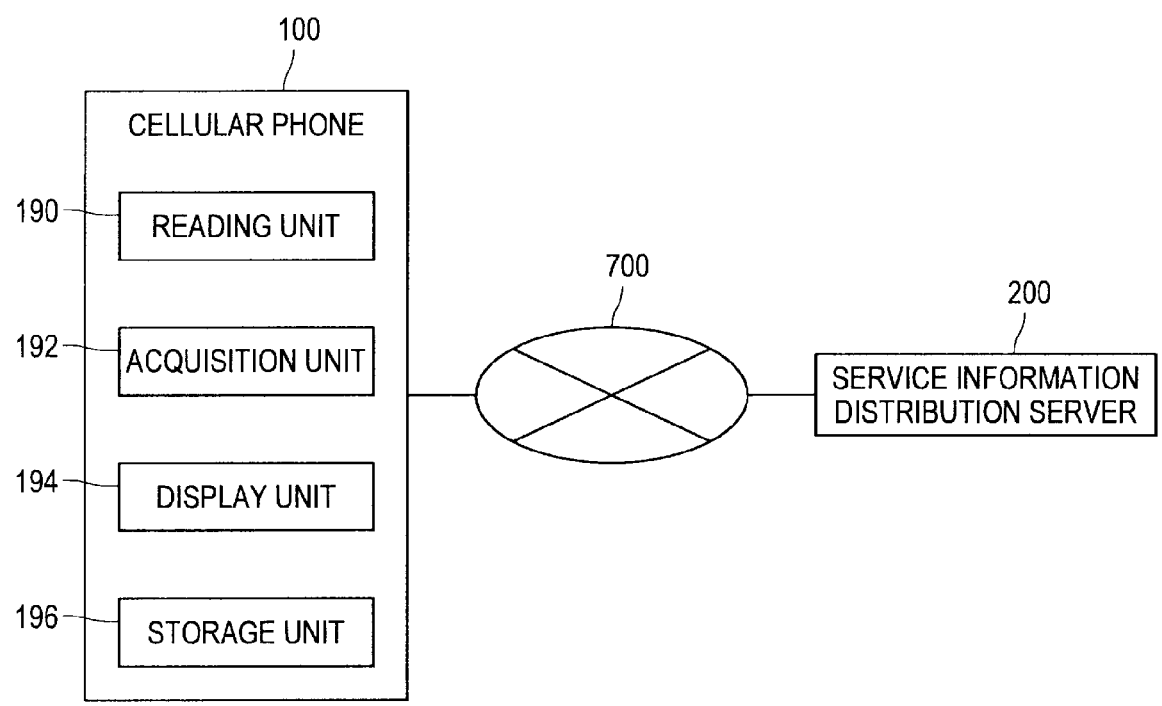
FIG. 5 is a block diagram for illustrating a functional configuration of the cellular phone according to the embodiment.

Next, a functional configuration of the cellular phone will be explained. FIG. 5 is a block diagram for illustrating a functional configuration of the cellular phone according to the present embodiment.

In FIG. 5, the cellular phone 100 includes a reading unit 190, an acquisition unit 192, a display unit 194 and a storage unit 196.

The reading unit 190 reads, from the memory area of the IC chip 120, identification information of a service via the communication network 710 from the service providing server 600 and a service registered in the cellular phone 100 including a service via non-contact communication from the information processing apparatus 510, for example, which use a memory area of the IC chip 120. The acquisition unit 192 acquires the service information for enabling a user to use services shown in FIG. 12 from the service information distribution server 200 by transmitting the identification information of the service which the reading unit 190 has read to the service information distribution server 200. The display unit 194 displays to enable the user to use the services based on the service information acquired by the acquisition unit 192. The storage unit 196 stores the service information acquired by the acquisition unit 192.

When the storage unit 196 stores service information, the acquisition unit 192 acquires the service information of a new version by transmitting, to the service information distribution server 200, version information included in the service information in addition to the identification information of the service which the reading unit 190 has read. The display unit 194 displays to enable the user to use the services based on the service information of the new version when the acquisition unit 192 acquires the service information of the new version, and displays to enable the user to use the service based on the service information stored in the storage unit 196 when the acquisition unit 192 does not acquire the service information of the new version.

When the acquisition unit 192 acquires the service information of the new version, the storage unit 196 stores the service information of the new version in place of the service information of an old version.

The display unit 194 displays to enable the user to use the service based on the service information stored in the storage unit 196 if the acquisition unit 192 cannot acquire the service information from the service information distribution server 200 when the storage unit 196 stores the service information.

The reading unit 190 reads identification information of a main service which uses the memory area of the IC chip 120. The acquisition unit 192 acquires main service information for enabling the user to use the main service and information for specifying related services, from the service information distribution server 200, by transmitting the identification information of the main service which the reading unit 190 has read, to the service information distribution server 200. The reading unit 190 reads the identification information of the related services based on the information for specifying the related services. The acquisition unit 192 acquires the related service information for enabling the user to use the related services from the service information distribution server 200, by transmitting the identification information of the related services which the reading unit 190 has read to the service information distribution server 200. The display unit 194 displays to enable the user to use the main service and the related services based on the main service information and the related service information which the acquisition unit 192 has acquired.

The storage unit 196 stores the main service information, the related service information, and the information for specifying the related services, which the acquisition unit 192 acquired. The reading unit 190 reads identification information of the related services based on the information for specifying the related services stored in the storage unit 196 if the acquisition unit 192 cannot acquire the information for specifying the related services from the service information distribution server 200 when the information for specifying the related services is stored in the storage unit 196. The display unit 194 displays to enable the user to use the main service and the related services based on the main service information and the related service information which are stored in the storage unit 196 if the acquisition unit 192 cannot acquire neither the main service information nor the related service information from the service information distribution server 200 when the main service information and the related service information are stored in the storage unit 196.

[A Preliminary Processing of Displaying Services]

Hereinafter, a preliminary processing of displaying services performed by the information processing system 1000 according to the present embodiment will be explained. FIG. 6 is a sequence diagram showing a preliminary processing of displaying services, executed by the information processing apparatus according to the present embodiment.

In FIG. 6, the service information providing server 300 creates a key pair for digital signature (step S101). Then, the service information providing server 300 registers a secret key of the created key pair to the service information distribution server 200 (step S102). The service providing server 300 provides a public key of the created key pair to the client application public server 400 (step S103). The service information providing server 300 registers service information as the distribution information shown FIG. 12 and the information for specifying related services shown in FIG. 13 to the service information distribution server 200 (step S104). Note that the information processing apparatuses 510, 610 and 612 register the service information as the distribution information shown FIG. 12 and the information for specifying related services shown in FIG. 13 to the service information providing server 300 in advance.

The client application public server 400 embeds the provided public key into a client application (step S105).

Note that the client application is an application for performing a later-describe processing of displaying services in FIG. 7 and FIG. 9. The client application public server 400 opens the client application in which the public key is embedded (step S106). Thus, the client application can be installed into the cellular phone 100.

Note that in the present embodiment, the service information providing server 300 and of the service information providing server 200 can be replaced with a server which includes functions of the service information providing server 300 and of the service information providing server 200.

FIG. 12 is an illustration for illustrating a configuration of the service information. In FIG. 12, service information is configured from ID information, version information, service name information, service icon information, service company name information, service company URL information, cooperative application information, and service unique screen information. As for the service information in FIG. 12, not only common items in all the service companies but also unique items for each of the service companies, such as the service name information, the service company name information or the like, can be defined.

FIG. 13 is an illustration for illustrating a configuration of information for specifying the related services. In FIG. 13, information for specifying the related services is configured from the ID information, the version information, and identification object/identification condition information.

[A Processing of Displaying Services]

Hereinafter, a processing of displaying services that the information processing system 1000 according to the present embodiment performs will be explained. This processing is a processing which is performed by the client application installed into the cellular phone 100. FIG. 7 is a sequence diagram showing a processing of displaying services according to the present embodiment. The processing of displaying services in FIG. 7 is a processing performed when the cellular phone 100 and the service information distribution server 200 are both online, and can communicate. Note that FIG. 10 is an illustration for illustrating a detail on the processing of displaying services in FIG. 7.

In FIG. 7, at first, the cellular phone 100 reads information for specifying the main service (hereinafter, referred to as "the main service identification information") that obtains a memory area, such as a segment information of the memory area, for example, from the memory area of the storage device 184 of the IC chip 120 (step S201).

Next, the cellular phone 100 reads the version information of the main service information and of the information for specifying related services from the database 140 when the database 140 stores the main service information and the information for specifying related services (step S202).

Next, the cellular phone 100 transmits the main service identification information which has been read in step 201 to the service information distribution server 200 (step S203). Note that in step S203, when the database 140 stores the main service information and the information for specifying related services, the cellular phone 100 transmits the version information of the main service information and of the information for specifying related services, which has been read in step 202, to the service information distribution server 200 as well as the main service identification information.

Next, the service information distribution server 200 reads the service information of the main service shown in FIG. 12 from a service information database 210 based on the main service identification information that has been read in s201. When the service information distribution server 200 receives the version information of the main service information, the service information distribution server 200 reads the service information of the main service of the new version from the service information database 210. The service information distribution server 200 reads the information for specifying the related services shown in FIG. 13 from a related services specifying information database 220. When the service information distribution server 200 receives the version information of the information for specifying related services, the service information distribution server 200 reads the information for specifying related services of the new version from the related services specifying information database 220 (step S204).

Next, the service information distribution server 200 assigns a digital signature to the distribution information using the secret key which is registered in a signature key (secret key) repository 230 after being registered in step S102 of the preliminary processing of displaying services in FIG. 6 (steps S205).

Next, the service information distribution server 200 transmits the distribution information assigned with the digital signature to the cellular phone 100 (step S206).

If the main service information of the new version and the information for specifying related services are not transmitted from the service information distribution server 200 when the cellular phone 100 transmits the version information of the information for specifying the main service information and the related services to the service information distribution server 200 in step s203, the cellular phone 100 reads the information for specifying the main service information and the related services from the database 140 (step S207). When any information of the version newer than the main service information or the information for specifying related services which are stored in the database 140 is not stored in the service information distribution server 200, communication traffic with the service information distribution server 200 can be decreased since the cellular phone 100 does not receive neither the main service information nor the information for specifying related services from the service information distribution server 200.

Next, the cellular phone 100 performs a later-described processing of related service identification (step S208), and reads information for identifying related services that uses the memory area (hereinafter, referred to as "the identification information of the related services").

Next, the cellular phone 100 transmits the identification information of the related services which has been read in step S208 to the service information distribution server 200 (step S209). Note that in step S209, when the service information related to the database 140, the cellular phone 100 transmits the version information of the related service information transmits to the service information distribution server 200 in addition to the identification information of the related services.

Next, the service information distribution server 200 reads the service information of the related services shown in FIG. 12 to a service information database 210 based on the identification information of the related services that has been received. When the service information distribution server 200 receives the version information of the related service information, the service information distribution server 200 reads the service information of the related services of the new version from a service information database 210 (step S210).

Next, the service information distribution server 200 assigns a digital signature to the distribution information using the secret key which is registered in the signature key (secret key) repository 230 after being registered in step S102 of the preliminary processing of service display in FIG. 6 (step S211).

Next, the service information distribution server 200 transmits the distribution information assigned with the digital signature to the cellular phone 100 (step S212).

If the related service information of the new version are not transmitted from the service information distribution server 200 when the cellular phone 100 transmits the version information of the related service information to the service information distribution server 200 in step S209, the cellular phone 100 reads the related service information from the database 140 (step S213).

Next, the cellular phone 100 deletes the unneeded data stored in the database 140 (step S214).

Next, the cellular phone 100 registers/updates the distribution information received in the steps S206 and S212 to the database 140 (step S215).

Next, the cellular phone 100 displays services registered in the cellular phone 100 based on the main service information among the distribution information received in step S206, and the related service information among the distribution information received in step S212 (step S216), and ends this processing.

Following to the processing of displaying services in FIG. 7, the cellular phone 100 transmits the identification information of the main service which has been read from the memory area of the storage device 184 of the IC chip to the service information distribution server 200, and receives the main service information and the information for specifying related services from the service information distribution server 200. Further, the cellular phone 100 reads the identification information of the related services based on the information for specifying related services that has been received, transmits the identification information of the related services that has been read to the service information distribution server 200, and receives the related service information from the service information distribution server 200. Then based on the received main service information and the received related service information, the cellular phone 100 displays services registered in the cellular phone 100, that is the cellular phone 100 displays all the services including services which uses the memory area of the IC chip but does not use applications. Thus users can view all the services registered in the cellular phone 100.

FIG. 8 is a flow chart showing a processing of related service identification executed in step S208 in FIG. 7.

In FIG. 8, the cellular phone 100 determines an object to be identified for specifying the related services based on the information for specifying related services among the distribution information which has been received in step S206 (step S301).

As the result of the determination in steps S301, if the object to be identified is data in the IC chip 120, the cellular phone 100 reads the data on the specific place of IC chip (step S302). Then, the cellular phone 100 specifies related services based on the data that has been read (step S303), and proceeds to a later-described processing of step S308. In step S303, if the data on the specific place of the IC chip 120 is X, it is assumed that a service A exists as a related service, or is registered in the cellular phone 100.

As the result of the determination in step S301, if the object to be identified is an existence as an application, the cellular phone 100 confirms the existence of a specific application in the application manager 130 (steps S304). The cellular phone 100 specifies related services based on the confirmation result of the existence of the specific application (steps S305), and proceeds to a later-described processing of step S308. In step S305, regarding to a name of the specific application, for example, if the application exists, it is assumed that the service A exists as an related service, or is registered in the cellular phone 100.

As the result of the determination in step S301, if the object to be identified is a usage history, bookmark or the like of the web browser 110, the cellular phone 100 searches the usage history, bookmark or the like of the web browser 110 (step S306). Then the cellular phone 100 specifies related services based on the result of the search for the usage history, bookmark or the like of the web browser 110, and proceeds a later-described processing in step S308. In steps S307, regarding to the usage history of the web browser 110, for example, if there is a book with a bookmark of page "a", it is assumed that a service A exists as a related service, or is registered in the cellular phone 100. In step S307, regarding to the usage history of the web browser 110, for example, if there is the usage history within last seven days, it is assumed that a service A exists as a related service, or is registered in the cellular phone 100.

In the following step S308, based on the information for specifying related services among the distribution information which has been received in step S206, the cellular phone 100 determines whether or not all the related services are specified. If all the services are not specified (No in steps S308), the cellular phone 100 returns to the processing of step S301. If all the services are specified (YES in step S308), the cellular phone 100 ends this processing.

[A Processing of Displaying Other Services]

Hereinafter, a processing of displaying other services that the information processing system 1000 according to the present embodiment performs will be explained. This processing is a processing which is performed by the client application installed into the cellular phone 100. FIG. 9 is a sequence diagram showing a processing of displaying other services according to the present embodiment. The processing of displaying other services in FIG. 9 is a processing performed when the cellular phone 100 and the service information distribution server 200 are both offline, and cannot communicate. Note that FIG. 11 is an illustration for illustrating a detail on the processing of displaying other services in FIG. 9.

In FIG. 9, at first, the cellular phone 100 reads identification information of the main service, such as a segment information of the memory area, for example, from the memory area of the storage device 184 of the IC chip 120 (step S401).

Next, the cellular phone 100 reads the main service information and the information for specifying related services from the database 140, based on the identification information of the main service which has been read in step S401 (steps S402). Note that the cellular phone 100 verifies a digital signature assigned to the main service information and the information for specifying related services in step S402. Thus, defacing of the information stored in the database 140 can be detected.

Next, the cellular phone 100 performs a processing same as the processing of related service identification which is performed in step S208 of the processing of displaying services in FIG. 7 (step S403), and reads the identification information of the related services that uses the memory area.

Next, the cellular phone 100 reads the related service information from the database 140 based on the identification information of the related services which has been read in step S403 (step S404). Note that a digital signature assigned to the related service information is verified in step S404.

Next, the cellular phone 100 deletes the unneeded data stored in the database 140 (step S405).

Next, the cellular phone 100 displays services registered in the cellular phone 100 based on the main service information which has been read in step S402 and the related service information which has been read in step S404 (step S406), and ends this processing.

Following to the processing of displaying services in FIG. 9, the cellular phone 100 reads the main service information and the information for specifying related services from the database 140 based on the identification information of the main service which has been read from the memory area of the storage device 184 of the IC chip 120. Then based on the main service information and the related service information which are read, the cellular phone 100 displays services registered in the cellular phone 100. Thus even in the case when the cellular phone 100 and the service information distribution server 200 are both offline, an advantageous effect same as the one in the processing of displaying services in FIG. 7 can be expected.

Note that the above embodiment can also be realized when the IC chip 120 is removed from the cellular phone 100 and is mounted to other different cellular phone 100.

The effects of the present embodiment can be also achieved in a case where a storage medium storing program codes for software, that is to achieve the functions of each of the foregoing embodiments, are provided to the system or the device, and where a computer (or a CPU, MPU, etc.,) of the system or the device reads and executes the program codes stored in the storage medium.

In this case, the program codes read out of the storage medium are by itself to achieve the functions of each of the foregoing embodiment, and the program codes and the storage medium storing the program codes are to constitute the present embodiment.

The storage medium for providing the program codes is, for example, an optical disk, a magnetic tape, a non-volatile memory card or a ROM, such as a floppy (registered trademark) disk, a hard disk, a magnet-optical disk, CD-ROM, CD-R, CD-RW, DVD-ROM, DVD-RAM, DVD-RW or DVD+RW. The program codes may also be downloaded via network.

Further, the functions of each foregoing embodiment can be realized not only by executing the program codes read out by the computer, but also in a case where an OS (operating system) or the like running onto a computer performs all or a part of the actual processing based on the instructions of the program codes.

Further, the functions of each foregoing embodiment can also be realized in a case where the program codes read out of the storage medium is written onto a memory included in a function enhancement board inserted into a computer or a memory included in a function enhancement unit connected to a computer, then based on the instructions of the program cords, a CPU or the like included in the function enhancement board and the function enhancement unit performs all or a part of the enhancement functions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
a processor,
a reading unit that reads, from a memory area of an integrated circuit ("IC") chip, identification information of a registered service including at least any one of a wire communication service via an external wire communication or a wireless communication service via an external wireless communication, which use the memory area of the IC chip; and
an acquisition unit that acquires service information from an external server by transmitting the identification information of the registered service which the reading unit has read to the external server; and an application manager that performs management of at least one application that provides at least one service; and
a display unit configured to display detail information on all registered services which are registered in the information processing apparatus and use the memory area of the IC chip based on the service information which the acquisition unit has acquired, wherein detail information for at least two registered services are displayed concurrently, and all the registered services include (i) at least one service that is not managed by the application manager and not provided by a web browser, uses the memory area of the IC chip, and does not use an internally installed application on the information processing apparatus and (ii) the at least one service that is managed by the application manager, uses the memory area of the IC chip, and does use an internally installed application on the information processing apparatus.

2. The information processing apparatus according to claim 1, wherein all the services include at least one service that uses an internally installed application on the information processing apparatus.

3. The information processing apparatus according to claim 1, further comprising a storage unit that stores the service information which the acquisition unit has acquired, wherein the acquisition unit acquires service information of a new version by transmitting version information included in the service information as well as the identification information of the service which the reading unit has read, to the external server, if the service information is stored in the storage unit, and
wherein the display unit displays to enable a user to use the service based on the service information of the new version if the acquisition unit acquires the service information of the new version, and displays to enable the user to use the service based on the service information stored in the storage unit if the acquisition unit does not acquire the service information of the new version.

4. The information processing apparatus according to claim 1, wherein the service includes a main service which owns the memory area of the IC chip, and a related service that uses the memory area owned by the main service, and wherein the reading unit specifies the related service that relates to the main service, based on information for specifying the related service which the acquisition unit has acquired or which the reading unit has acquired from the storage unit.

5. The information processing apparatus according to claim 3, wherein the storage unit stores the service information of the new version in place of the service information of an old version when the acquisition unit acquires the service information of the new version.

6. The information processing apparatus according to claim 3, wherein the display unit displays to enable the user to use the service based on the service information stored in the storage unit if the acquisition unit cannot acquire the service information from the external server when the service information is stored in the storage unit.

7. The information processing apparatus according to claim 1,
wherein the service includes the main service which owns the memory area of the IC chip, and the related service that uses the memory area owned by the main service,
wherein the reading unit reads identification information of the main service that uses the memory area of the IC chip,
wherein the acquisition unit acquires main service information for enabling a user to use the main service and the information for specifying the related service from the external server by transmitting the identification information of the main service which the reading unit has read to the external server;
wherein the reading unit reads the identification information of the related service based on the information for specifying the related service;
wherein the acquisition unit acquires related service information for enabling the user to use the related service from the external server by transmitting the identification information of the related service which the reading unit has read to the external server; and
wherein the display unit displays to enable the user to use the main service and the related service based on the main service information and the related service information which the acquisition unit has acquired.

8. The information processing apparatus according to claim 7, further comprising a storage unit which stores the main service information that the acquisition unit has acquired, and the related service information, and the information for specifying the related service,
wherein the reading unit reads the identification information of the related service based on the information for specifying the related service stored in the storage unit, if the acquisition unit cannot acquire the information for specifying the related service from the external server when the information for specifying the related service is stored in the storage unit, and
wherein the display unit displays to enable the user to use the main service and the related service based on the main service information and the related service information which are stored in the storage unit, if the acquisition unit cannot acquire neither the main service information nor the related service information from the external server when the main service information and the related service information are stored in the storage unit.

9. The information processing apparatus according to claim 7, wherein the information for specifying the related service includes information for specifying the service based on data in the memory area of the IC chip, information for specifying the service based on the applications installed in the information processing apparatus, or information for specifying the service based on an usage history or a bookmark of a web browser.

10. The information processing apparatus according to claim 1, wherein all registered services further include at least one service that is provided by a web browser.

11. A non-transitory computer readable storage medium storing a computer program including executable instructions that when executed by an information processing apparatus performs steps comprising:
reading from a memory area of an integrated circuit ("IC") chip, identification information of a registered service including at least any one of a wire communication service via an external wire communication or a wireless communication service via an external wireless communication, which use the memory area of the IC chip;
acquiring service information from an external server by transmitting the identification information of the registered service which the reading unit has read to the external server; and
managing, by an application manager, at least one application that provides at least one service;
displaying detail information on all registered services which are registered in the information processing apparatus and use the memory area of the IC chip based on the service information which the acquisition unit has acquired, wherein detail information for at least two registered services are displayed concurrently, and all the registered services include (i) at least one service that is not managed by the application manager and not provided by a web browser, uses the memory area of the IC chip, and does not use an application installed on the information processing apparatus and (ii) the at least one service that is managed by the application manager, uses the memory area of the IC chip, and does use an internally installed application on the information processing apparatus.

12. A information processing system comprising:
an information processing apparatus; and
an external server that is capable of communicating with the information processing apparatus,
wherein the information processing apparatus includes:
a reading unit that reads, from a memory area of an integrated circuit ("IC") chip, identification information of a registered service including at least any one of a wire communication service via an external wire communication or a wireless communication service via an external wireless communication, which use the memory area of the IC chip;
an acquisition unit that acquires service information from an external server by transmitting the identification information of the registered service which the reading unit has read to the external server; and
an application manager that performs management of at least one application that provides at least one service;
a display unit configured to display detail information on all registered services which are registered in the information processing apparatus and use the memory area of the IC chip based on the service information which the acquisition unit has acquired, wherein detail information for at least two registered services are displayed concurrently, and all the registered services include (i) at least one service that is not managed by the application manager and not provided by a web browser, uses the memory area of the IC chip, and does not use an application installed on the information processing apparatus and (ii) the at least one service that is managed by the application manager, uses the memory area of the IC chip, and does use an internally installed application on the information processing apparatus.

13. An information processing apparatus comprising:
a display;

an IC chip interface configured to connect an integrated circuit ("IC") chip having a memory area capable of storing identification information of a registered service;

a communication unit configured to transmit the identification information of the registered service to an external apparatus and to receive service information from the external apparatus; and an application manager that performs management of at least one application that provides at least one service;

a controller enabling the display to display detail information on all registered services which are registered in the information processing apparatus and use the memory area of the IC chip based on the received service information, wherein detail information for at least two registered services are displayed concurrently, and all the registered services include (i) at least one service that is not managed by the application manager and not provided by a web browser, uses the memory area of the IC chip, does not use an internally installed application on the information processing apparatus, and is not provided by a web browser and (ii) the at least one service that is managed by the application manager, uses the memory area of the IC chip, and does use an internally installed application on the information processing apparatus.

14. The information processing apparatus according to claim 1, wherein the identification information transmitted to the external server includes at least one of a service ID, version information, and identification object/identification condition information.

15. An information distribution server comprising:
a processor; and
a memory device storing instructions which when executed by the processor, causes the processor to:
receive identification information of a first registered service, which is registered in an information processing apparatus, from the information processing apparatus and read from an integrated circuit ("IC") chip, wherein the first registered service is not managed by an application manager that performs management of at least one application that provides at least one service and not provided by a web browser, uses a memory area of the IC chip, does not use an internally installed application on the information processing apparatus, and is not provided by a web browser; and
transmit first service information corresponding to the identification information for displaying first detail information of the first registered service;

receive identification information of a second registered service, which is registered in the information processing apparatus, from the information processing apparatus and read from the IC chip, wherein the second registered service is managed by the application manager, uses the memory area of the IC chip, and does use an internally installed application on the information processing apparatus; and
transmit second service information corresponding to the identification information for displaying second detail information of the second registered service,
wherein detail information for at least two registered services are displayed concurrently.

16. The information distribution server according to claim 15, wherein the instructions further cause the processor to:
read the service information from a database storing a plurality of pieces of identification information corresponding to a plurality of pieces of service information.

17. An information distribution method comprising:
receiving, by an information distribution server, first identification information of a first registered service, which is registered in an information processing apparatus, read from the integrated circuit ("IC") chip by an information processing apparatus, wherein the first registered service is not managed by an application manager that performs management of at least one application that provides at least one service and not provided by a web browser, uses a memory area of the IC chip, and does not use an internally installed application on the information processing apparatus;
transmitting, by the information distribution server, first service information corresponding to the first identification information for displaying first detail information of the first registered service;
receiving, by an information distribution server, identification information of a second registered service, which is registered in the information processing apparatus, read from the IC chip by the information processing apparatus, wherein the second registered service is managed by the application manager, uses the memory area of the IC chip, and does use an internally installed application on the information processing apparatus; and
transmitting, by the information distribution server, second service information corresponding to the second identification information for displaying second detail information of the second registered service,
wherein detail information for at least two registered services are displayed concurrently.

* * * * *